United States Patent
Antonietti et al.

[11] Patent Number: 6,054,111
[45] Date of Patent: Apr. 25, 2000

[54] LYOTROPIC LIQUID-CRYSTAL PHASES OF AMPHIPHILIC BLOCK COPOLYMERS AS TEMPLATE FOR THE PREPARATION OF MESOPOROUS SOLIDS

[75] Inventors: Markus Antonietti, Marburg; Christine Göltner, Bad Hersfeld, both of Germany

[73] Assignee: Max-Planck-Gesellschaft zur Forderung der Wissenschaften E.V., Munich, Germany

[21] Appl. No.: 09/022,721

[22] Filed: Feb. 12, 1998

[30] Foreign Application Priority Data

Feb. 13, 1997 [DE] Germany ............................ 197 05 497

[51] Int. Cl.[7] .................................................. C01B 33/36
[52] U.S. Cl. .................. 423/702; 423/328.1; 423/328.2; 423/335; 419/2
[58] Field of Search ....................................... 423/702, 705, 423/706, 328.1, 328.2, 335; 419/2

[56] References Cited

U.S. PATENT DOCUMENTS 5,250,282   10/1993   Kresge et al. ........................... 423/705
5,304,363   4/1994    Beck et al. .............................. 423/328.1
5,840,271   11/1998   Carrazza et al. ........................ 423/700

FOREIGN PATENT DOCUMENTS 9639357   12/1996   WIPO .

OTHER PUBLICATIONS

Lewis, Hawley's Condensed Chemical Dictionary, Twelfth Edition, p. 936, 1993.

Huo et al., "Mesostructure Design with Gemini Surfactants: Supercage Formation in a Three–Dimensional Hexagonal Array," Science, vol. 268, 1324–27, Jun. 1995.

George S. Attard, et al., "Liquid–crystalline phases as templates for the synthesis of mesoporous silica" Letters to Nature, vol. 378, (Nov. 23, 1995), pp. 366–368.

Derwent Abstract of JP 57 077 023 A (May 14, 1982).

*Primary Examiner*—Mark L. Bell
*Assistant Examiner*—David Sample
*Attorney, Agent, or Firm*—Norris, McLaughlin & Marcus, P.A.

[57] ABSTRACT

The invention relates to a method of synthesizing mesoporous solids using amphiphilic block copolymers as templates.

12 Claims, 4 Drawing Sheets

LYOTROPIC LIQUID-CRYSTAL PHASES OF AMPHIPHILIC BLOCK COPOLYMERS AS TEMPLATE FOR THE PREPARATION OF MESOPOROUS SOLIDS

SPECIFICATION

The invention relates to a method of synthesizing mesoporous solids using amphiphilic block copolymers as templates.

Organic mesoporous solids with pore diameters ranging from 2 to 50 nm are an important complement to crystalline zeolites. Conventional methods of preparing mesoporous silica gels make use of ionic surfactants as structure-directing agents and sometimes of inert oils as swelling agents (U.S. Pat. Nos. 5,057,296; 5,108,725; 5,098,684 and 5,102,643). These methods, however, have certain drawbacks. For one thing, phase changes make it difficult to monitor the structures during the synthesis. A further disadvantage is that where pores sizes exceed approx. 5 nm, the inadequate wall thickness renders the inorganic nanostructure mechanically unstable, so that it collapses. Yet another drawback is that the surface of hitherto-known inorganic mesoporous substances is largely unstructured, since these materials are obtained as fine powders with small particle sizes.

A considerable improvement to this method was obtained with the sol-gel synthesis of mesoporous silica gels in the lyotropic liquid-crystal phases of low-molecular nonionic amphiphilic surfactants (Attard et al., Nature 378 (1995) 366–367. In this case, as a result of microphase separation and nanometer-scale microstructure formation, the polyreaction of an inorganic, water-soluble starting component, eg, silicic acid, is limited to the hydrophilic area of the liquid crystal, so that when the inorganic material solidifies, a monolithic replica of the liquid-crystal structure is obtained. By contrast to the method described previously, in which a powder is formed automatically, here macroscopic structures such as porous layers are also directly accessible. Drawbacks of this method, however, consist in that low-molecular surfactants lead only to pores of limited diameter, and that high-purity, low-molecular surfactants are very expensive.

A publication by A. Bagshaw and J. Pinnavaia (Angew. Chem. 108 (1996), 1180–1183) describes the preparation of mesoporous molecular sieves from aluminum oxide using polyethylene oxide surfactants as templating agents. However, the mesoporous substances obtained in this way contain only pores which have no recognizable long-range packing order, since they are synthesized under conditions which do not lead to the formation of ordered, lyotropic liquid-crystal phases. This disordered packing of the pores has the disadvantage that there is no possibility of controlling the structures, and that the pore size distribution cannot be as narrow as in the case of synthesis in a liquid crystal.

The object of this invention was to provide a method of synthesizing mesoporous solids of variable pore diameter, which overcomes—at least in part—the drawbacks of the prior art.

The invention is based on the finding that if polymeric liquid-crystal aggregates are used as templating agents for the synthesis of mesoporous materials, mechanically stable, nanometer-scale structures with a clearly defined packing order and large, uniform pore diameters which can be adjusted throughout the polymer are accessible. Polymeric, lyotropic liquid-crystal phases like this are formed preferably from amphiphilic block copolymers consisting of at least two blocks of different polarity, one of which is water-soluble.

The structures of the materials obtained using the method of the invention are regular, ie, they have a uniform type of symmetry with uniform, characteristic lengths, and can be described with the help of low-angle x-ray scattering or by imaging with transmission electron microscopy (TEM). The materials prepared using the method of the invention can, eg, exhibit hexagonal and lamellar pore morphologies, as well as cubic and rod-shaped structures.

Besides the uniform pore size and the high stability, the advantage of the method described here lies in the facile functionalization of the basic inorganic structure by other components, which may be present during the synthesis and/or incorporated thereafter. In addition, not only ceramic and glass structures but also metals are accessible with the method of the invention.

Specific examples of materials prepared according to the method of the invention are mesoporous silica gels which form in the liquid-crystal phase as a result of condensation of suitable precursors, eg, silicon alkoxides. Other examples are mesoporous oxidic or sulfidic semiconductors and ceramics, which are obtained by oxidic or sulfidic precipitation on the templating agent. Lastly, mesoporous metals are accessible by reduction of metal salts in or on the template.

Another advantage of using liquid-crystal templates for synthesizing mesoporous materials is the fact that pore sizes can be obtained which make it possible to coat the inside of the pore wall—without blocking the pores—with catalytically active species such as metal oxides, metals or enzymes by means of a subsequent chemical reaction on the mesoporous carrier.

The pore size is adjustable simply by varying the length of the polymer template in the range from 2 to 60 nm, preferably from 3 to 50 nm. On completion of the polymerization reaction the template is removed, and a mechanically and thermally stable nanostructure is obtained.

One embodiment of this invention is thus a method of synthesizing a mesoporous solid, comprising the steps:
a) forming a fluid mixture comprising at least one template present in a lyotropic liquid-crystal phase and at least one precursor which can react to form a solid,
b) reacting the precursor,
c) optionally removing volatile components from the reaction mixture and
d) removing the template,
wherein the template is an amphiphilic polymer.

The precursor is preferably an inorganic monomer which reacts—eg, by way of polymerization—to form a solid, eg, a glass, a ceramic material or a metal. Examples of precursors which can be converted by polymerization into glass or ceramic materials are metal alkoxides such as $Si(OR)_4$, $Al(OR)_3$ and $Ti(OR)_4$ or mixtures thereof, where R is independently in any occurence a straight-chain or branched and optionally substituted $C_{1-C8}$ alkyl residue. It is preferable that substituents, if present, are inert, ie, they do not take part in the precursor reaction under the conditions prevailing. Examples of substituents are halogens, OH etc. Particularly preferred precursors are silicon alkoxides such as tetramethoxysilane.

The method of the invention also allows for the use of precursors which result in a solid metallic material. Examples of suitable metal-forming precursors are metal compounds which, in the presence of the template, are able to form a metallic mesoporous structure. This metallic structure can be formed by way of a chemical reaction, eg, reduction, or by other means. Preferred metal compounds are metal salts and/or metal complexes, eg, of noble metals such as Ru, Rh, Pd, Ag, Os, Ir, Pt, Au or mixtures thereof. A specific example of a metal-forming precursor is ammonium tetrachloroplatinate.

The reaction of the precursor to a solid can take place in different ways. The solid framework can, eg, be formed by condensation of metal alkoxides in the liquid-crystal phase, by oxidic or sulfidic precipitation in the template or by reduction of metal salts in the template. For the condensation of metal alkoxides it is preferable to adjust the fluid medium to an acidic pH. The reduction of metal salts can be effected by addition of an appropriate reducing agent such as hydrazine.

According to the method of the invention, the fluid medium is selected such that the amphiphilic polymer is able to form a lyotropic liquid-crystal phase. By determining the viscosity and birefringence characteristics, one can determine when this liquid-crystal phase has formed. The mixture is then subjected to conditions under which the precursor reacts. A suitable catalyst may be added for this purpose.

The method of the invention makes it possible to synthesize mesoporous solids of variable composition, for example through use of mixtures of precursor substances. In this way, solids frameworks can be obtained which contain more than one component.

To this end use can be made of mixtures of metal alkoxide monomers such as $Si(OR)_4$ and $Al(OR)_3$. It is also possible to polymerize a metal alkoxide such as $Si(OR)_4$ with a comonomer selected from a metal salt, eg, an aluminum or vanadium salt, an organometallic compound or a functionalized orthosilicate $R—Si(OR)_3$, where R is an alkyl or a functionalized alkyl residue, a halogen such as Cl, Br or F, or CN. Examples of functionalized alkyl residues are alkyl residues bearing epoxide or amino groups. Introduction of an alkyl group serves the purpose of imparting hydrophobicity to the solid. Introduction of CN, for example, serves the purpose of immobilizing metal colloids. Functionalized alkyl residues are introduced if other substances, eq, biological substances such as antibodies, are to be coupled physically or chemically later on.

Another modification means consists in carrying out the precursor reaction in the presence of inert substances, ie, substances which do not react under the conditions prevailing in the fluid medium, so that these substances are incorporated into the pores of the solid structure during synthesis. Examples of such inert substances are biomolecules, eg, proteins such as enzymes, or metal colloids.

The pores of the solid can also be modified in various ways after the reaction. For example, the pores can be coated by means of precipitation and/or sol-gel synthesis. This can be achieved, for example, by precipitating a metallic salt on the surface of the solid, depositing noble metals from the gas phase or by means of chemically reducing a suitable metal salt on the suface, hydrolyzation and polycondensation of metal alkoxides in the pores of the nanostructure. It is also possible—by means of adsorption or covalent coupling—to immobilize organic substances on the surface of the pores.

The solid can also be modiified after the reaction by means of exchanging framework units. To this end, foreign atoms can be incorporated into the surface of the basic silicate framework through replacement with foreign ions, eg, $AlO_4^-$ in place of $SiO_4$. This exchange can be effected, eg, by bringing a basic $SiO_4$ framework into contact with a solution of a metal salt.

An essential feature of the method according to the invention is the use of amphiphilic polymers as templates for the preparation of a lyotropic liquid-crystal phase. The template is preferably an amphiphilic blockcopolymer, preferably having the structure $A_n$-$C_m$-$B_n$, $A_n$-$C_m$-$B_n$-$C_m$-$A_n$ or $B_n$-$C_m$-$A_n$-$C_m$-$B_n$, where A is a hydrophobic structural unit, B is a hydrophilic structural unit, C is a low- or high-molecular, hydrophobic or hydrophilic structural unit, n—is independently in any occurence an integer in the range from 5 to 500 and m—is independently in any occurrence—an integer in the range from 0 to 20.

The units A of the hydrophobic blocks are preferably selected—in each case independently—from straight-chain or branched, mono- or polyunsaturated $C_4$–$C_8$- and, in particular, $C_4$–$C_5$-olefins, eg, butadiene or isoprene, styrene and hydrophobically substituted styrenes such as alkyl or halogenated styrenes and hydrophobic alkyl acrylates, alkyl methacrylates and dialkylsiloxanes. The units B of the hydrophilic blocks are preferably selected—in each case independently—from ethylene oxide, vinyl alcohols, vinylamines, vinylpyridines, acrylic acid, methacrylic acid, hydrophilic acrylic and methacrylic esters and amides and styrene sulfonic acids. The blocks $C_m$, which may or may not be present, serve to bridge the hydrophilic and hydrophobic blocks A and B and may be introduced to facilitate synthesis and/or to modify the phase structure. The units C are preferably selected independently from structural units as defined for A and B. It is of particular advantage if the structural block $C_m$, independently in any occurence, is a hydrophobic or a hydrophilic polymer.

It is also of advantage if $A_n$, $B_n$ and $C_m$ each constitute blocks which, independently in any occurence, consist of a single species of structural unit. Special preference is given to $A_n$ and $B_n$ homopolymers.

Block copolymers that are suitable as template for the method of the invention can be prepared by way of living anionic, cationic, radical and group-transfer polymerization. It is of particular advantage if they are prepared according to a combined process, which is described in DE patent specification 41 34 967. Specific examples of products made by means of this process are the SE 10/10 and SE 30/30 polymers (styrene ethylene oxide block copolymers, the respective blocks having molecular weights from 1000 to 3000) sold by the company Gold-schmidt.

Step (c) of the method according to the invention comprises removal of volatile components from the reaction mixture. This step can take place before and/or after the reaction of the precursor to a solid. These volatile components are usually the fluid medium optionally together with other components that may be contained in the mixture, as well as any volatile reaction products that may be formed, eg, the alcohol (R—OH) released when metal oxides are hydrolyzed. Volatile components are preferably removed under vacuum, if necessary by heating.

Step (d) of the method according to the invention comprises the removal of the template and if necessary of non-volatile reaction by-products. This step is preferably carried out by means of calcination, ie, by heating to elevated temperatures, and/or by means of extraction. Calcination is preferably effected by heating initially in an inert atmosphere and then in the presence of oxygen. The calcining temperature depends on the thermal stability of the components making up the solid. For silca-gel solids, calcining temperatures of 450°–500° C. have proved suitable. Extraction is effected in the usual way using water, organic solvents such as acetone or a mixture thereof. It is preferable if combined use is made of extraction and calcination.

A further object of this invention is a mesoporous solid obtainable by means of a method as described above. The pore diameter of the solid can be varied over a range from 2 to 60 nm. It is of particular advantage if the pore diameter is in the range from 3 to 50 nm. The average diameter of the particles obtainable by the method of the invention is, preferably in the range of from 0.1–20 mm, more preferably in the range of from 1–10 mm. Moreover, the solids of the invention may have birefractive optical properties as can be gathered from the exam-ples.

The solid according to the invention has a characteristic periodicity which is generally ≧5 nm. It is particularly preferable if the periodicity is in the range from 5 to 25 nm. The solids according to the invention may be, eg, of hexagonal or lamellar nanostructure. They may also exhibit cubic symmetry. Preferably, the surface order and/or surface structure of the solids is substantially determined by the pore system.

The mesoporous solids according to the invention have a large number of uses. Examples include chromatographic applications, separation processes, heterogeneous catalysis, sensory analysis and also use in optical and electronic components.

The following drawings and examples serve to explain the invention in more detail.

EXAMPLES

Example 1

Figure 1:
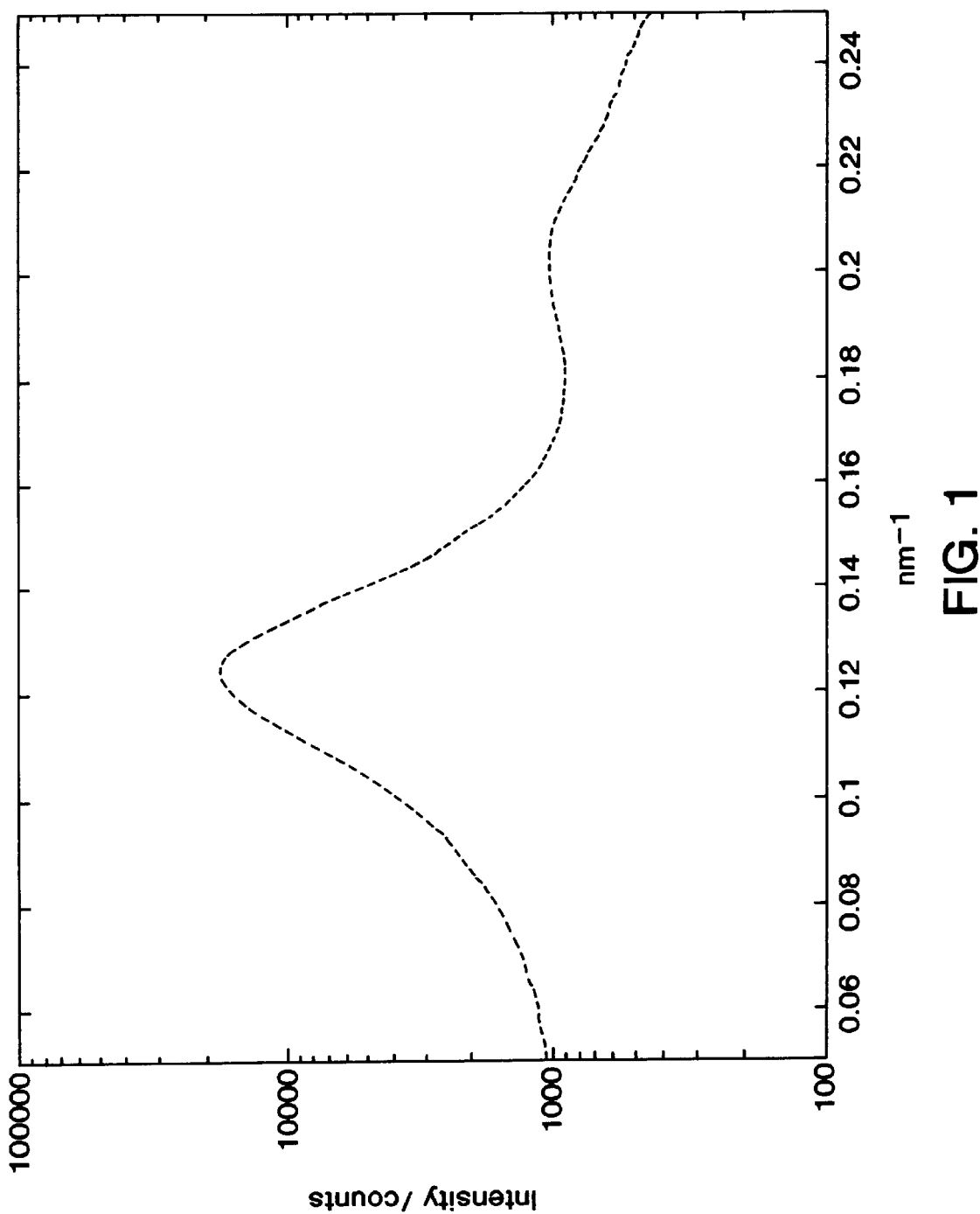
FIG. 1 shows a low-angle x-ray diffractogram of a mesoporous silica gel according to the invention (example 1)
Figure 2:
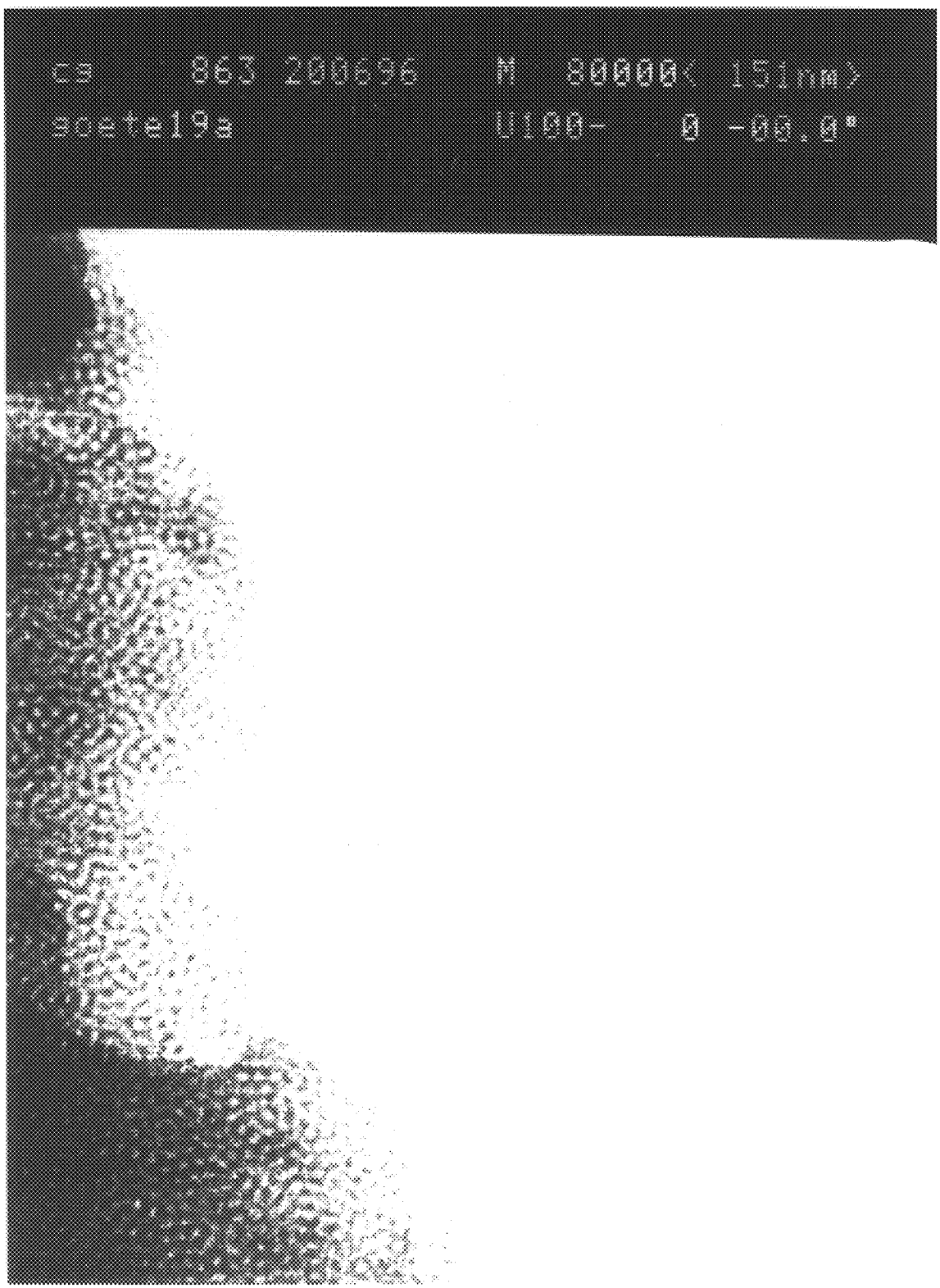
FIG. 2 shows a transmission-electron-microscopic (TEM) image of the silica gel of FIG. 1.

Mesoporous silica gel using SE 30/30 as template 2000 mg SE 30/30 are dissolved under gentle heating in 4000 mg tetramethoxysilane. 2000 mg diluted hydrochloric acid (pH 2) are added to this mixture; when the exothermic reaction has died down, methanol formed during the hydrolysis is removed from the reaction mixture under vacuum. Once the reaction mixture is viscous and birefractive, the open reaction vessel is left to stand for for 12 h at 50° C., during which time the reaction mixture solidifies to a hard glass. This is subjected to 12 hours of continuous extraction with acetone and then calcined at 450°–500° C. (6 h under nitrogen, 6 h under oxygen). The material obtained has a nanostructure with a characteristic periodicity of 13 nm (FIG. 1). A typical TEM image is shown in FIG. 2, wherin M represents the magnification factor.

Example 2

Figure 3:
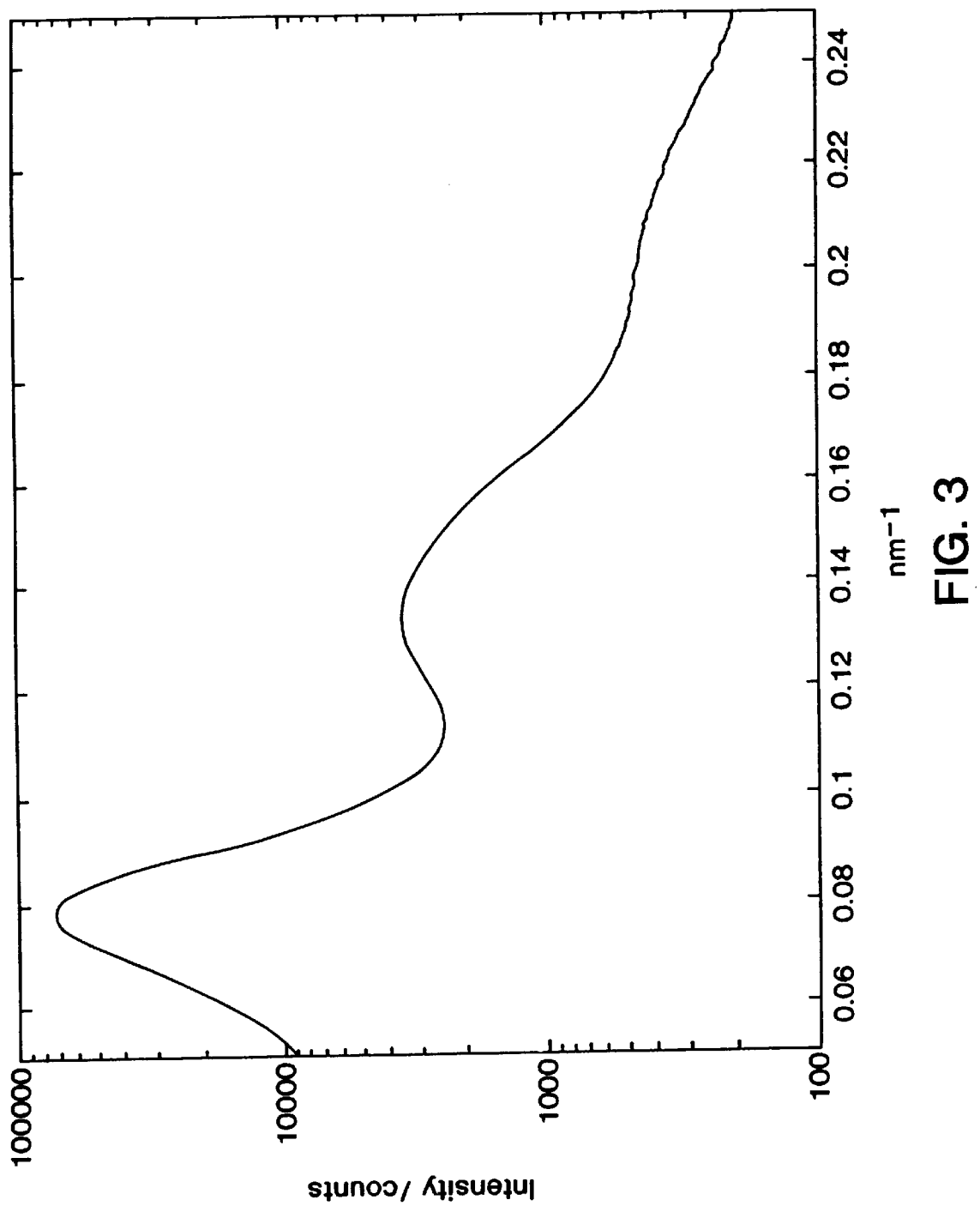
FIG. 3 shows a low-angle x-ray diffractogram of another mesoporous silica gel according to the invention (example 2)
Figure 4:
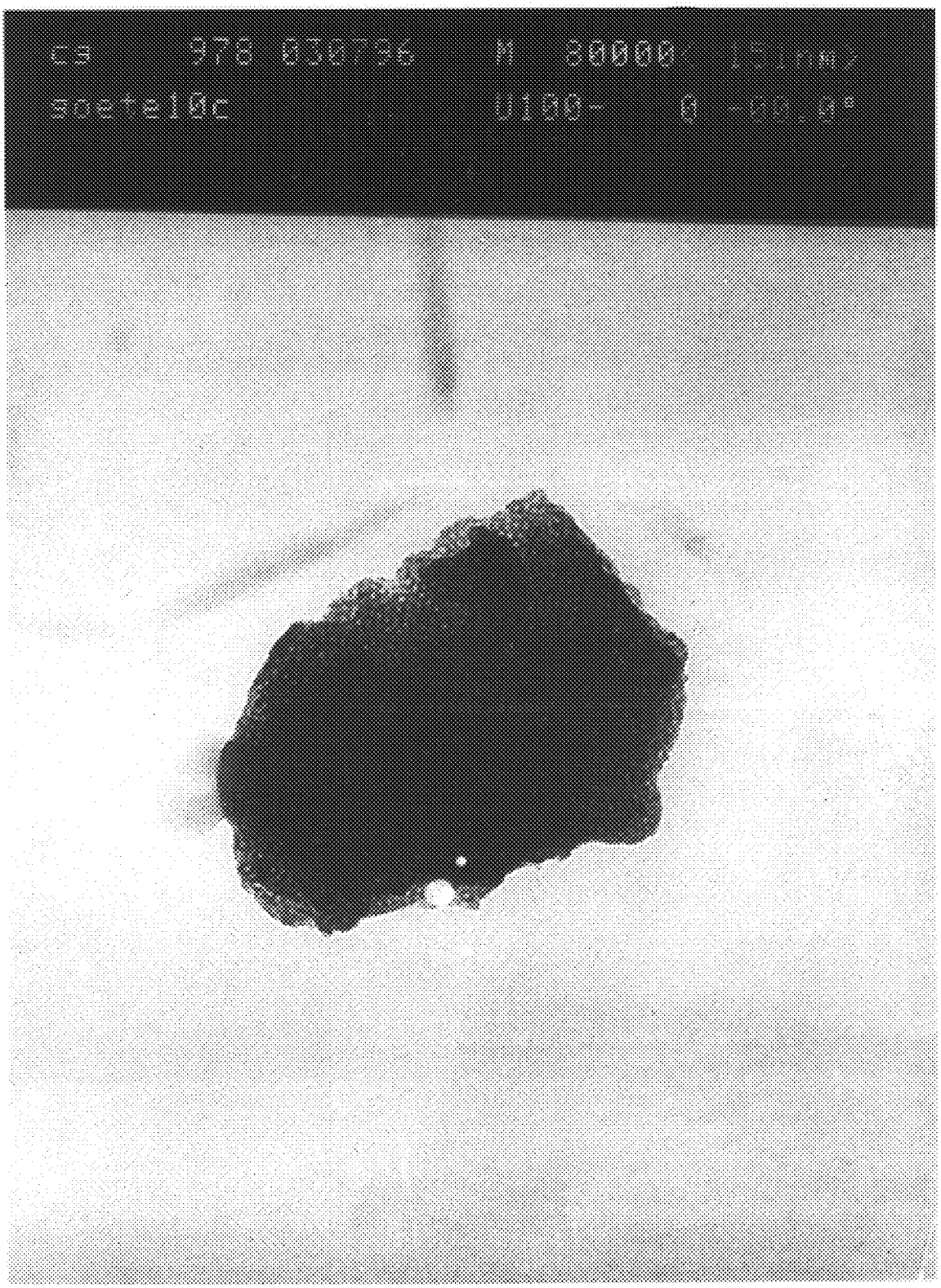
FIG. 4 shows a TEM image of the silica gel of FIG. 2

Mesoporous aluminium silicate using SE 10/10 as template 2000 mg SE 10/10 are dissolved under gentle heating in 3000 mg tetramethoxysilane. A solution of 500 mg aluminium chloride hydrate in 2500 mg water is added to this mixture; when the exothermic reaction has died down, methanol formed during the hydrolysis is removed from the reaction mixture under vacuum. Once the reaction mixture is viscous and birefractive, the open reaction vessel is left to stand for for 12 h at 50° C., during which time the reaction mixture solidifies to a hard glass. This is subjected to 12 hours of continuous extraction with acetone and then calcined at 450°–500° C. (6 h under nitrogen, 6 h under oxygen) . The material obtained has a nanostructure with a characteristic periodicity of 8 nm (FIG. 3). A typical TEM image is shown in FIG. 4.

Example 3

Mesoporous platinum using SE 10/10 as template 200 mg ammonium tetrachloroplatinate are dissolved in 100 mg water and mixed with 1000 g SE 10/10. Independently thereof, 45 mg hydrazine are dissolved in 600 mg water and mixed with 600 mg SE 10/10. The mixtures are applied to two glass plates and brought into contact with each other by pressing the plates together. After approx. 10 h the reaction product is extracted repeatedly with acetone and water.

We claim:

1. The method of synthesizing a mesoporous solid, comprising the steps of:
   (a) forming a fluid mixture comprising at least one template present in a lyotropic liquid-crystal phase and at least one precursor which can react to form a solid;
   (b) reacting the precursor;
   (c) optionally removing volatile components from the reaction mixture and
   (d) removing the template,
   wherein
   the template is an amphiphilic block copolymer having the structure $A_n$-$C_m$-$B_n$, $A_n$-$C_m$-$B_n$-$C_m$-$A_n$ or $B_n$-$C_m$-$A_n$-$C_m$-$B_n$, wherein A is a hydrophobic structural unit selected independently from the group consisting of $C_4$-$C_8$-olefins, styrene and hydrophobically substituted styrenes, hydrophobic alkyl acrylates, hydrophobic alkyl methacrylates and hydrophobic dialkylsiloxanes, B is a hydrophilic structural unit, C is a hydrophobic or hydrophilic structural unit, n is independently in any occurrence an integer in the range from 5 to 500 and m is independently in any occurrence an integer in the range from 0 to 20.

2. The method of claim 1, wherein the precursor is selected from the group consisting of $Si(OR)_4$, $Al(OR)_3$, $Ti(OR)_4$ and mixtures thereof, where R is in each case a straight-chain or branched and optionally inertly substituted $C_1$-$C_8$ alkyl residue.

3. The method of claim 1, wherein the precursor is selected from the group consisting of metal compounds which, in the presence of the template, are able to form a metallic, mesoporous structure.

4. The method of claim 1, wherein each unit B is selected independently from the group consisting of ethylene oxide, vinyl alcohols, vinylamines, vinylpyridines, acrylic acid, methacrylic acid, hydrophilic acrylic and methacrylic esters and amides and styrene sulfonic acids, and each unit C is selected independently from the structural units as defined for A and B.

5. The method of claim 4,
   wherein
   each $C_m$, independently in any occurence, is a hydrophobic or a hydrophilic polymer.

6. The method according to claim 4, wherein $A_n$, $B_n$ and $C_m$ are block polymers which, independently in any occurrence, consist of a single species of structural unit.

7. The method according to claim 1, wherein a catalyst is added to accelerate the precursor reaction.

8. The method according to claim 1, wherein step (d) comprises a calcination, an extraction or both.

9. The method according to claim 1, wherein a mixture of precursor substances is used for the reaction.

10. The method according to claim 1, wherein the reaction is carried out in the presence of inert substances which are incorporated into the pores of the solid.

11. The method according to claim 1, wherein the surface of the solid is coated after the reaction.

12. The method according to claim 1, wherein the solid is modified after the reaction by exchanging framework units.

* * * * *